United States Patent Office 2,908,128
Patented Oct. 13, 1959

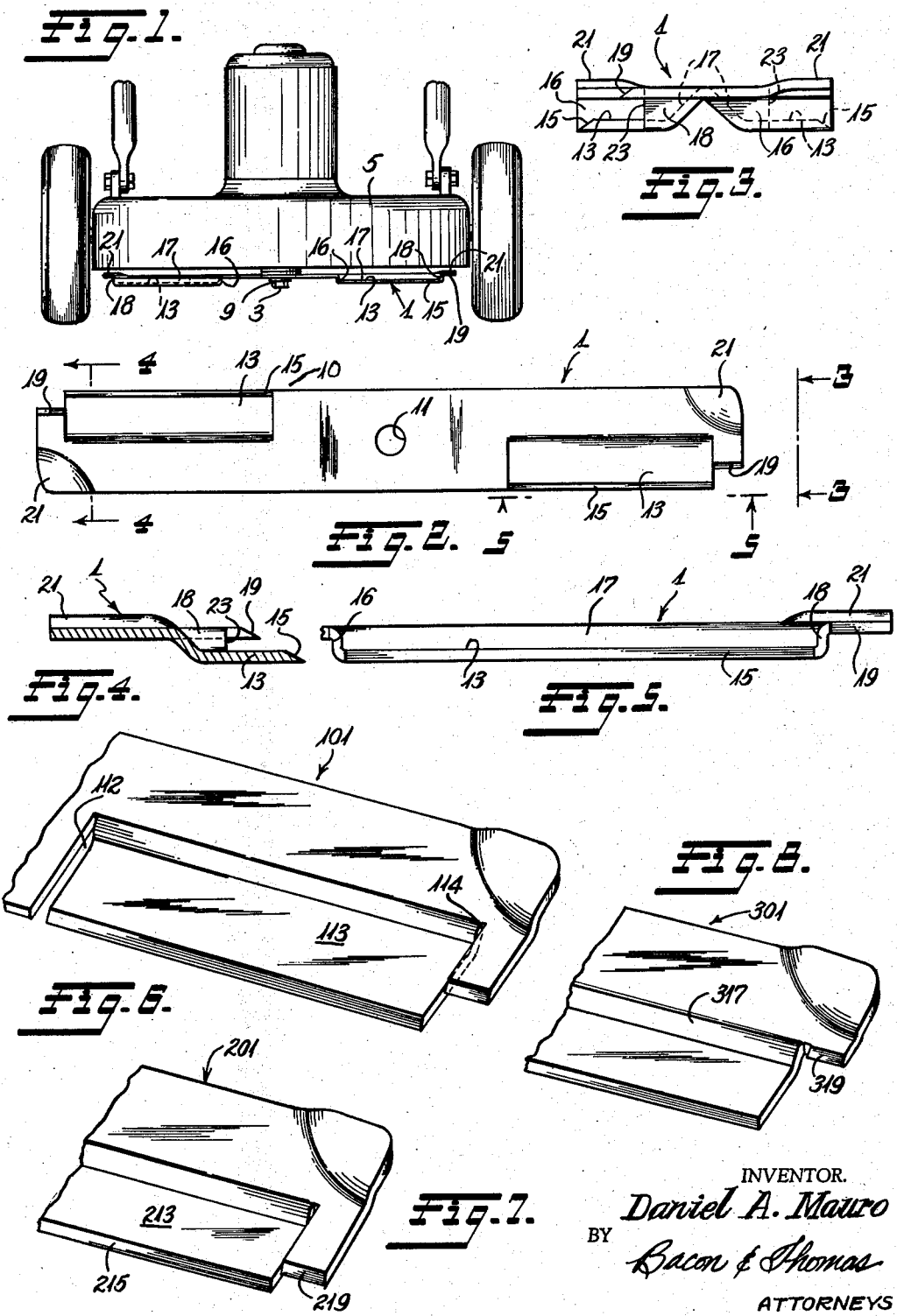

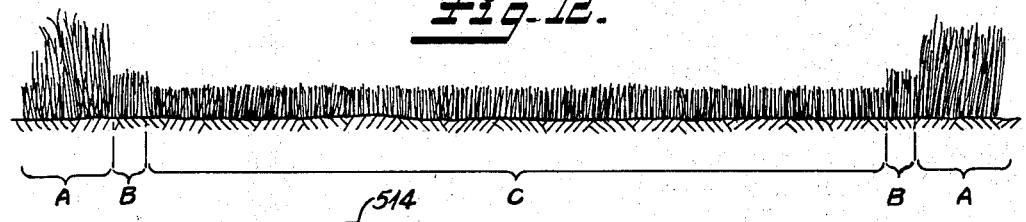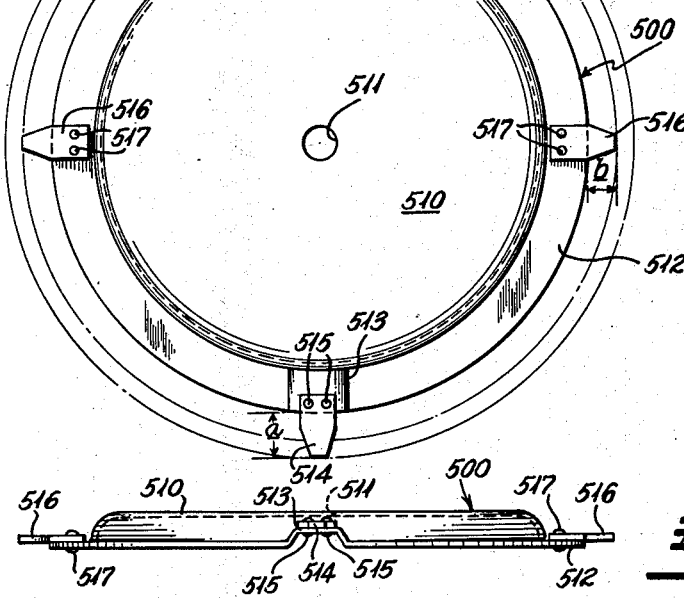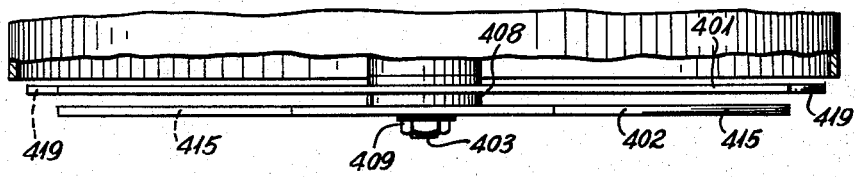

2,908,128

CUTTING DEVICE FOR ROTARY MOWERS

Daniel A. Mauro, Wilmington, Del.

Application November 26, 1957, Serial No. 699,091

7 Claims. (Cl. 56—295)

This invention relates generally to cutting devices for mowing lawns, and more particularly to a novel lawn mower blade adapted to be used with a rotary type mower.

Mowers of the rotary type have become increasingly popular in recent years due to various advantages they have over the more conventional reel-type mower, and primary among these advantages is that the rotary mower will cut weeds, and tall, thick grass which cannot be cut by the reel-type mower. This advantage, however, is somewhat minimized in the conventional rotary mower because when such grass is cut the lawn is left with a rough unfinished appearance.

Accordingly, one of the primary objects of the present invention is to provide a cutting device for a rotary lawn mower which cuts the lawn evenly despite the presence of tall weeds, and tall or thick grass, and which accomplishes this result with only one passage of the mower thereover.

Another object is to provide a cutting device for a rotary lawn mower which will reduce the size of resultant cuttings.

Another object is to provide a cutting device for a rotary lawn mower which will be relatively unaffected in its trimming action after encountering rocks or other obstacles.

Another object is to provide a cutting device for a rotary mower which will create a strong updraft to straighten up the individual blades of grass and facilitate disposal of the cuttings.

Another object is to provide a cutting device which may be installed in conventional rotary lawn mowers and wherein the cutting level may be adjusted in the usual manner.

Another object is to provide a cutting device for a rotary mower which is strong and durable in use, readily sharpened when desired and economical to manufacture.

Other objects and advantages will be apparent from the following description when taken in conjunction with the accompanying drawings, in which:

Fig. 1 is a front elevational view disclosing one embodiment of the instant cutting device mounted on a rotary mower;

Fig. 2 is an enlarged top plan view of the cutting device shown in Fig. 1;

Fig. 3 is an enlarged end elevation of the cutting device looking in the direction of the arrows 3—3 of Fig. 2;

Fig. 4 is an enlarged sectional view taken on the line 4—4 of Fig. 2;

Fig. 5 is an enlarged fragmentary front elevational view looking in the direction of the arrows 5—5 of Fig. 2;

Fig. 6 is a fragmentary perspective view of another embodiment of the invention;

Fig. 7 is a fragmentary perspective view of the third embodiment of the invention;

Fig. 8 is a fragmentary perspective view of a fourth embodiment of the invention;

Fig. 9 is an elevational view disclosing a fifth embodiment of the invention installed in a rotary mower;

Fig. 10 is a top plan view of a sixth embodiment of the invention;

Fig. 11 is a front elevational view of the cutting device shown in Fig. 10; and

Fig. 12 is a diagrammatic view illustrating the action of a cutting device made in accordance with the present invention.

It has been found that when mowing weeds, and tall or thick grass, a person using a rotary mower with a conventional mower blade should make one passage therethrough with the blade at a raised level to cut the tallest of the grass. Then, to achieve the desired finished appearance, a second passage should be made with the blade at a slightly lower position. The present invention contemplates achieving both operations in one passage, by having an outer raised cutting edge which will contact the unmowed grass first to cut off the upper portions of the taller blades, and also an inner lower cutting portion which will even off or trim the portion of the lawn which has been already pre-cut by the outer cutting edge.

Referring more particularly to the drawings, the blade 1 is adapted to be mounted in the conventional manner on the power shaft 3 of a rotary mower 5, as by means of a nut 9, the shaft 3 extending through an aperture 11 in the blade.

Each half of the blade 1 is provided with a depressed portion 13 medially positioned along its leading edge, and the free edge 15 of each depressed portion may be sharpened as desired to serve as a cutting edge. The depressed portions 13 may be readily formed by a conventional stamping operation, depressing these portions ¼ to ½ inch in depth and leaving an inner web 16, a rear web 17, and an outer web 18 connecting each of the two depressed portions 13 with the rest of the blade. Depressed portions 13 are spaced somewhat inwardly from the respective outer extremities of the blade as will be discussed hereinafter; and need not be extensive in length to achieve the desired cutting edges. However, it has been found that if depressed portions about six inches in length are employed, these portions in cooperation with the rear webs 17 create a favorable updraft which, in turn, assists the cutting operation. It will be noted in this regard that the entire rear longitudinal edge of each depressed portion 13, lying opposite the respective free edge 15 thereof, is connected to the remainder of the blade 1 by the rear web 17.

The portion of the leading edge 10 of each half of the blade lying outwardly of the respective depressed portion 13 is cut back and sharpened to provide a cutting edge, as indicated at 19. These cutting edges 19 also need not be extensive in length, but are preferably approximately one inch long to achieve the desired rigidity. The edges 19 thus begin at approximately the point along the length of the blade where the edges 15 end.

To add to the updraft created by depressed portions 13 and rear webs 17, raised portions 21 may be formed during the stamping operation on the trailing sides of blade 1 at the outer corners thereof. Further, it has been found desirable to cut away the leading portions of the outer webs 18, as indicated at 23 to facilitate sharpening, and similar provisions may be made if desired on the respective inner webs 16.

The cutting edges 19, lying in the main plane of the blade 1 and above the plane of edges 15, serve to cut the taller grass in an arc lying at the front and at either side of the mower. Thus, as the mower moves forward, the aforementioned arc also moves forward and the cutting edges 19 cut a swath in the path of the mower which is as wide as the entire width of the blade 1 and leaves the grass cut at a level corresponding to the level of outer cutting edges 19. This cutting operation can readily be seen from the diagrammatic showing of Fig. 12 where grass of a height shown in the zone A is cut off by the edges 19 to a level indicated in the zone B. As the mower moves forward, the cutting edges 15, operating in a similar but smaller arc, recut the main portion of the area which has been cut by the edges 19. The cutting operation of cutting edges 15 is at a lower level, as shown at C in Fig. 12, and serves to trim the lawn and leave a smooth finished appearance.

It will be understood that most of the stones or other obstacles which may be encountered are met by the readily sharpenable outer edges 19 and do not affect the sharpness of the inner cutting edges 15. The latter edges therefore are maintained in the necessary condition to perform the trimming operation.

As shown in Figs. 6 through 8, the depressed portions of the mower blade may be constructed in various different ways. In the embodiment of Fig. 6, for example, two transverse slits 112 and 114 extend from the leading edge of each half of the blade 101, and the depressed portion 113 can be readily formed in the area of the blade lying between these slits. The outer blade portion may also be constructed in several different ways. For example, in the embodiment shown in Fig. 7, the outer cutting edge 219 of blade 201 may be formed with little or none of the leading edge removed. In this form the outer cutting edge is in vertically displaced alignment with the cutting edge 215 of depressed portion 213, or may be slightly in advance of or to the rear of the latter edge. In the embodiment of Fig. 8, on the other hand, a major amount of the outer blade portion may be removed and the cutting edge 319 of blade 301 formed in a substantial alignment with the rear web 317 of the blade.

Another form of the invention, shown in Fig. 9, contemplates the provision of two blades mounted in superimposed relation. The upper blade 401 is mounted on the power shaft 403 and a second blade 402 is mounted in spaced relation below the first blade by means of a spacing washer 408. A nut 409 threaded on the bottom of the power shaft 403 serves to secure the blades in assembled relation. The upper blade 401 includes a leading cutting edge 419 adjacent each of its outer extremities. Lower blade 402 is shorter than the upper blade, preferably extending between points immediately below the inner extremities of the upper cutting edges 419. The lower blade 402 includes leading cutting edges 415 adapted to trim off the lawn after the upper cutting edge 419 has cut away the taller grass. It will readily be understood that the dual blade assembly may be mounted in true superimposed relation, as shown, or may, if desired, be mounted with one blade displaced in any angular relationship with respect to the other blade about the axis of the power shaft 403.

In the embodiment of Figs. 10 and 11, a cutting assembly 500 is disclosed, comprising a substantial dome-shaped central member 510 having a centrally disposed aperture 511 formed therein for connection to the power shaft of a mower. An outwardly extending flange 512 is formed around the periphery of the member 510 and includes a pair of oppositely disposed raised portions 513. Cutting blades 514 are mounted on each of the raised portions 513, as by rivets 515, and extend outwardly a particular distance *a* from the periphery of flange 512. Similarly, a pair of oppositely disposed blades 516 are mounted by rivets 517 ninety degrees around the periphery of flange 512 from the blades 514. The blades 516 extend outwardly beyond the flange 512 a particular distance *b* which is less than the aforementioned distance *a*. Blades 514 and 516 may be shaped and sharpened as desired. In this embodiment of the invention it will readily be seen that the cutting edges of the blades 514 cut the taller grass about an arc in front of and on either side of the assembly, while the shorter and lower blades 516 cut in a similar but smaller and lower arc to even off the grass cut by the blades 514.

It will be understood that various changes in the design and details of construction of the devices described herein may be made without departing from the principles of the invention or the scope of the annexed claims.

I claim:

1. A cutting device for a rotray mower, comprising: an integral horizontal blade having a main portion which is substantially flat and which includes an outer horizontal cutting edge formed on the outer end portion of its leading edge, said integral blade having a medial portion thereof lying radially inward from said outer end portion turned downwardly and extending laterally in the direction of said leading edge to define a depressed blade portion lying in a plane substantially parallel to that of said main portion, an inner horizontal cutting edge being formed on the leading edge of said depressed portion, said inner cutting edge being disposed at a substantially lower level than said outer cutting edge and entirely inwardly of the inner radial extent of said outer cutting edge.

2. A cutting device as defined in claim 1 wherein the inner and outer extremities of said depressed portion are defined by spaced transverse slits.

3. A cutting device as defined in claim 1 wherein said outer cutting edge is substantially in vertically displaced alignment with the inner cutting edge.

4. A cutting device as defined in claim 1 wherein said outer cutting edge is positioned rearwardly of said inner cutting edge.

5. A cutting device as defined in claim 1 wherein said outer cutting edge is substantially in vertically displaced alignment with respect to the rear extremity of said depressed blade portion.

6. A cutting device for a rotary mower, comprising: an integral horizontal blade, each end of said blade having a main portion which is substantially flat and which includes an outer horizontal cutting edge formed on the outer end portion of its leading edge, each end of said blade having a medial portion thereof lying radially inward from the respective outer end portion turned downwardly and extending laterally in the direction of the respective leading edge to define a depressed blade portion lying in a plane substantially parallel to that of the respective main portion, an inner horizontal cutting edge being formed on the leading edge of each of said depressed blade portions, said inner cutting edge being disposed at a substantially lower level than said outer cutting edge and entirely inwardly of the inner radial extent of said outer cutting edge.

7. A cutting device as defined in claim 6 wherein the outer corners of said blade ends on the respective trailing sides thereof are displaced upwardly out of the plane of said main portion to supplement the updraft effect caused by rotation of the blade.

References Cited in the file of this patent

UNITED STATES PATENTS

| | | |
|---|---|---|
| 1,954,579 | Smith | Apr. 10, 1934 |
| 2,682,142 | Clark | June 29, 1954 |
| 2,760,327 | Bovee | Aug. 28, 1956 |
| 2,764,865 | Pollard | Oct. 2, 1956 |
| 2,786,322 | McEvers | Mar. 26, 1957 |
| 2,799,985 | Rosenberg | July 23, 1957 |
| 2,857,729 | Zoldok | Oct. 28, 1958 |